(12) United States Patent
Ragaller et al.

(10) Patent No.: US 10,357,733 B2
(45) Date of Patent: Jul. 23, 2019

(54) FILTER RETENTATE REMOVAL SYSTEM AND METHOD

(71) Applicants: Paul Ragaller, Dorchester, MA (US); Alexander Sappok, Cambridge, MA (US); Leslie Bromberg, Sharon, MA (US)

(72) Inventors: Paul Ragaller, Dorchester, MA (US); Alexander Sappok, Cambridge, MA (US); Leslie Bromberg, Sharon, MA (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 14/937,950

(22) Filed: Nov. 11, 2015

(65) Prior Publication Data
US 2016/0136557 A1 May 19, 2016

Related U.S. Application Data

(60) Provisional application No. 62/079,545, filed on Nov. 13, 2014.

(51) Int. Cl.
*B01D 46/00* (2006.01)
*F01N 3/023* (2006.01)
(Continued)

(52) U.S. Cl.
CPC ......... *B01D 46/0068* (2013.01); *B01D 41/04* (2013.01); *F01N 3/0233* (2013.01);
(Continued)

(58) Field of Classification Search
CPC .... B01D 46/00; B01D 46/0068; B01D 41/04; B01D 46/0064; B01D 46/0067–0071;
(Continued)

(56) References Cited

U.S. PATENT DOCUMENTS 3,867,291 A 2/1975 Schmidt, Jr. et al.
5,156,660 A 10/1992 Wilson
(Continued)

FOREIGN PATENT DOCUMENTS

DE 10036597 A1 2/2002
EP 1865161 A2 12/2007
(Continued)

OTHER PUBLICATIONS

Donaldson Company Inc. Brochure, "Heavy-Duty Engine/Diesel Engine, Diesel Particulate Filter Thermal Regenerator", Brochure # F111182 ( )6/07), 2006, pp. 1-4.
(Continued)

*Primary Examiner* — T. Bennett McKenzie
(74) *Attorney, Agent, or Firm* — Daniel Deneufbourg

(57) ABSTRACT

A system and method for removing retentate from filters is disclosed, which utilizes pressurized and/or vacuum fluid through localized application. The disclosure describes a cleaning system and sequence of steps for carrying out the cleaning process, whereby, a fluid is directed to flow through a localized region of the filter media, thereby dislodging and removing accumulated retentate from the filter. In addition, the localized application of fluid flow allows for localized monitoring of the cleanliness of the filter with a high degree of spatial resolution. This filter retentate removal system and method is broadly applicable to a wide range of systems and processes ranging to engines and exhaust systems to production plants and equipment.

7 Claims, 4 Drawing Sheets

(51) Int. Cl.
*B01D 41/04* (2006.01)
*B01D 46/24* (2006.01)
*B01D 46/42* (2006.01)

(52) U.S. Cl.
CPC ........ *F01N 3/0237* (2013.01); *B01D 46/0057* (2013.01); *B01D 46/0064* (2013.01); *B01D 46/0067* (2013.01); *B01D 46/0075* (2013.01); *B01D 46/24* (2013.01); *B01D 46/2418* (2013.01); *B01D 46/42* (2013.01); *B01D 2258/01* (2013.01); *B01D 2273/18* (2013.01); *B01D 2279/30* (2013.01); *F01N 3/023* (2013.01)

(58) Field of Classification Search
CPC ............ B01D 2279/30; B01D 2273/18; B01D 2258/01; B01D 46/42; B01D 46/24; B01D 46/2418; B01D 46/0075; B01D 46/0057; F01N 3/0233; F01N 3/023; F01N 3/0237
USPC ...................................... 95/1–24; 55/282–305
See application file for complete search history.

(56) References Cited

U.S. PATENT DOCUMENTS

| | | | |
|---|---|---|---|
| 6,015,387 A * | 1/2000 | Schwartz | A61B 5/0031 600/12 |
| 6,221,255 B1 | 4/2001 | Vadoothker | |
| 7,025,811 B2 | 4/2006 | Streichsbier et al. | |
| 7,716,922 B2 | 5/2010 | Ehlers | |
| 7,767,031 B2 | 8/2010 | Thomas et al. | |
| 7,819,978 B2 | 10/2010 | Thomas et al. | |
| 7,837,750 B2 | 11/2010 | Katinas et al. | |
| 7,856,808 B2 | 12/2010 | Sisken | |
| 9,144,831 B2 | 9/2015 | Ragaller | |
| 2001/0013220 A1 | 8/2001 | Schonauer | |
| 2004/0103788 A1* | 6/2004 | Streichsbier | B01D 41/04 95/279 |
| 2006/0070359 A1* | 4/2006 | Sellers | B01D 46/0064 55/303 |
| 2006/0272301 A1* | 12/2006 | Morse | B01D 46/0086 55/439 |
| 2007/0277512 A1 | 12/2007 | Winsor | |
| 2008/0178413 A1* | 7/2008 | Wagner | B01D 41/04 15/319 |
| 2009/0020136 A1 | 1/2009 | Katinas et al. | |
| 2009/0044375 A1 | 2/2009 | Thomas et al. | |
| 2011/0146721 A1* | 6/2011 | Meister | B01D 41/00 134/22.1 |
| 2015/0231544 A1 | 8/2015 | Ragaller | |

FOREIGN PATENT DOCUMENTS

| | | |
|---|---|---|
| JP | 2-146212 A | 6/1990 |
| JP | 5-133216 A | 5/1993 |
| JP | 8-28247 A | 1/1996 |
| JP | 2000-508964 A | 7/2000 |
| JP | 2002-239327 A | 8/2002 |
| JP | 2003-3826 A | 1/2003 |
| JP | 2006-281132 A | 10/2006 |
| KR | 10-0536381 B1 | 12/2005 |
| WO | 97/39816 A1 | 10/1997 |
| WO | 2008/054262 A1 | 5/2008 |
| WO | 2013/084586 A1 | 6/2013 |

OTHER PUBLICATIONS

Donaldson Company, Inc. Brochure, "Heavy-Duty Diesel, DPF Pulse Cleaner", Brochure #F111181 (8/07), 2006, pp. 1-4.
SAE Technical Paper Series, 2006-01-3256, Oct. 2006, "Pressure Drop and Cleaning of IN-Use Ash Loaded Diesel Particulate Filters", pp. 1-13, Nuszkowski, et al.
US Doe Deer Conference, Sep. 2010, "Unraveling DPF Degradation using Chemical Tracers and Opportunities for Extending Filter Life", 20 pages, MIT/Sloan Automotive Laboratory, http://www1.eere.energy.gov/vehiclesandfuels/pdfs/deer_2010/thursday/presentations/deer10_sappok.pdf,Sappok, et al.
FSX Corporate Website, "TrapTester 7 Air Flow Test Bench", http://www.fsxinc.com/site1/products/traptester7.html,2008, 1 page.
FSX Corporate Website, "SootSucker Series Dust Collectors", http://www.fsxinc.com/site1/products/prod-suckers.html, 2008, 1 page.
FSX Corporate Website, "TrapBlaster 7 Pneumatic Cleaner (Stage 1)", http://fsxinc.com/site1/products/trapblaster7.html, 2008, 2 pages.
FSX Corporate Website, "TrapBurner 7 Thermal Cleaner (Stage 2)", http:www.fsxinc.com/site1/products/tburner7.html, 2008, 1 page.
FSX Corporate Website, "DPF Cleaning Technology Feature Comparison/Comparison of Pneumatic Filter Cleaning Machines", http://fscinc.com/site1/competition/featurecomparison.html, 2008, 2 pages.
FSX Corporate Website, DPF Cleaning Technology Comparison/Pulse Cleaning Technology vs. TrapBlaster Air Knife Scanning Technology, http://www.fsxinc.com/site1/competition/scan-pulse.html, 2008, 2 pages.

\* cited by examiner

FILTER RETENTATE REMOVAL SYSTEM AND METHOD

This application claims priority of U.S. Provisional Patent Application Ser. No. 62/079,545 filed Nov. 13, 2014, the disclosure of which is incorporated herein by reference in its entirety.

This invention was made under Contract Number NSF IIP 1230444 with the National Science Foundation. The National Science Foundation has certain rights in the invention.

BACKGROUND OF THE INVENTION

Particulate filters are used in a wide variety of situations and systems in order to both capture material or retentate and to control the composition or characteristics of the output fluid. The ability to effectively remove particulate matter collected within filters allows for the extension of their usable life as well as the ability to reinstall and reuse the filters. This invention relates to a system and method for removing and collecting trapped matter or retentate from a filter.

Examples which illustrate the broad applicability of particulate filter cleaning systems include commercial and passenger diesel particulate filter systems, gasoline particulate filters, and industrial processes and applications where particulate matter or retentate from any effluent stream (solid, liquid, or gas) must be controlled or minimized.

One particular example involves particular filters, such as diesel or gasoline particulate filters, where retentate collects in the filter and must be periodically dislodged and removed. Any filter or retentate collection media or system, however, would be a candidate for automated cleaning with this method.

The particulate filter is used to reduce or eliminate certain undesirable particulate substances from the exhaust of diesel or gasoline powered vehicles or equipment and power systems. In this instance, soot and ash may build up within the filter. Soot, which is carbon-based, is periodically oxidized by means of a regeneration process whereby the temperature of the filter is raised in order to facilitate the reaction of soot with oxygen, nitrogen dioxide, or some other oxidizing agent. This allows the oxidized carbon-based soot to leave the filter as carbon-oxide byproducts. Ash, however, consists of incombustible material, largely metallic oxides, sulfates, phosphates, and other materials, which cannot be oxidized from the filter. The filter must be periodically removed from the engine, equipment or machinery and cleaned.

Currently, cleaning methods involve a combination of pressurized air, thermal cleaning, liquid-based washing, vibrations, and other related means. Specific to ceramic particulate filters, which are generally of a cellular honeycomb-type design, with a plurality of channels blocked at alternating ends, the most common cleaning method involves a combination of thermal cleaning and reverse-flow pressurized air. These systems generally consist of a nozzle, which traverses at a given height over the outlet surface of the filter. The nozzle blows pressurized air at the back face of the filter, which dislodges deposited ash, causing it to migrate to the front of the filter and fall out. Another permutation of pressurized air cleaning involves a pulsed flow bench whereby pressurized air is forced through the entire filter from the outlet face in an unsteady fashion.

While moderately successful, these methods have many disadvantages, which the present invention overcomes. In the case of the traversing nozzle, there is no seal created between the nozzle and the filter. Therefore air is not forced directly through the filter, but may instead take the path of least resistance. This path is oftentimes around the filter, or away from the filter, rather than through the clogged filter element or channels. In the case of the pulsed flow technique, an end cap is fitted to the outlet of the filter and pulsed air is forced through the entire filter at once. The effectiveness of this method is limited by the fact that, once again, the air will take the path of least resistance (away from the clogged regions). This results oftentimes in entire sections of the filter being left unaffected by the cleaning process.

A further limitation of available cleaning methods is a lack of in situ information to quantify the retentate levels in the filter (or degree of clogging) during and the cleaning process as well as the cleanliness of the filter after cleaning. Local clogs and defects are oftentimes invisible to the cleaning process. It is further desirable to ascertain the quantity or characteristics of the retentate inside the filter to optimize the cleaning process parameters to most efficiently clean the filter.

In situ knowledge of retentate levels or the extent of filter clogging also allows the cleaning processes to be terminated once the filter is clean, rather than for a predetermined amount of time, as is currently the case with most cleaning systems.

Another limitation of current pneumatic or air-flow cleaning techniques is the large energy and infrastructure requirements of the techniques. For example, a non-contact air nozzle or air knife approach may loose considerable amount of the air in the nozzle to the surroundings. In some examples these systems may operate at flow rates ranging from 20 scfm to 120 scfm or more and nozzle pressures of 100 to 150 psi or more. These systems require large and expensive air compressors, as well as air handling and conditioning systems. As these nozzle-based cleaning processes do not contact or seal against the filter, much of the high pressure air is deflected from the filter surface, flows around the filter, flows at low speeds through the filter in regions remote from the nozzle, or follows the path of least resistance through regions of the filter which may be clean or minimally clogged. Not only do these systems produce inferior results, but much of the air is also wasted in the process. The present invention creates a seal around the surface of the filter, directing high pressure air flow locally through clogged regions of the filter, thus producing superior results with lower system costs, infrastructure requirements, and less wasted energy.

Pulsed flow methods, which direct a pulse of high pressure compressed air through the entire filter volume reduce air losses from escaping the filter, but also require large and expensive air compressors and infrastructure. The high pressure also may present a safety hazard and produce loud, undesirable "explosive" sounds. The sudden burst of high pressure pulses also introduces additional risk for retentate leakage and escape to the work environment, which presents a health and safety hazard. Furthermore, although the maximum pressure and flow rates of these systems may be high, the local flow through the individual channels is low (given the large filter area subjected to the flow) and also follows the path of least resistance. Similar to the air nozzle approach, pulsed cleaners also suffer from incomplete and inefficient retentate removal from the filter.

Alternative cleaning approaches, such as wet cleaning methods with chemical solutions, water, or even ultra-sonic cleaning, using a liquid to couple the ultrasonic waves to the filter, are also used. These cleaning methods suffer from limitations including chemical incompatibilities with certain filter media, or incompatibility with specific filter components (such as the fibrous matting in the case of certain types of particulate filters, for example). Additional limitations of wet cleaning systems include additional steps to dry or remove the cleaning liquid or solution from the filter following cleaning, as well as the recycling or disposal of the fluid itself.

The above-listed examples highlight the need for an improved process of dislodging and removing particulate matter or retentate collected on or in the filter media, which will have considerable utility for a broad range of applications and fields of uses.

The filter retentate cleaning system and method described in this disclosure enables direct and highly-localized, forced air cleaning of filters to efficiently remove the collected retentate media. It also allows for the cleanliness of the filter or retentate media to be quantified, on a local level and in the aggregate, before, during, or after the cleaning process.

SUMMARY OF THE INVENTION

The present invention is directed to a system for removing retentate from a filter comprising means for applying a fluid to one or snore localized regions of the filter for dislodging and removing the retentate from the one or more localized regions of the filter.

In one embodiment, the means for applying the fluid to the one or more localized regions of the filter comprises a fluid nozzle which seals against the one or more localized regions of the filter.

In one embodiment, the system further comprises an actuation mechanism for locating the fluid nozzle at the one or more localized regions of the filter.

In one embodiment, the actuation mechanism moves the fluid nozzle in two dimensions and comprises a spindle rotatable about a central axis, a linear housing attached to the spindle, at least one linear bearing rod mounted on the linear housing and a carriage, the nozzle being mounted to the carriage, the linear bearing rod along with the linear actuator allowing for the back and forth movement of the carriage and the nozzle mounted to the carriage.

In one embodiment, the system further comprises a vertical actuator for moving the fluid nozzle in a third dimension.

In one embodiment, the means for applying the fluid to the one or more localized regions of the filter comprises a manifold with one or more valves in concert with one or more conduits contained in a conduit housing that seals against the filter, the one or more valves being adapted to open and close to allow fluid to flow through the one or more of the conduits corresponding to the one or more localized regions of the filter.

In one embodiment, the means for applying the fluid to the one or more localized regions of the filter is located at the inlet or outlet of the filter and further comprising means at the other of the inlet or the outlet of the filter for applying a vacuum or pressure to the one or more localized regions of the filter comprising another manifold with one of more valves in concert with one or more conduits contained in a conduit housing that seals against the other of the inlet or outlet of the filter, the one or more of valves being adapted to open and close to apply a vacuum or pressure through the one or more of the conduits corresponding to the one or more localized regions of the filter.

In one embodiment, one or more sensors measure the amount of the retentate in the one or more of the localized regions of the filter.

The present invention is also directed to a method for removing retentate from a filter comprising the step of applying a fluid to one or more localized regions of the filter for dislodging and removing the retentate from the one or more localized regions of the filter.

In one embodiment, the method further comprises the steps of stopping the flow of the fluid through the one of the localized regions of the filter following the lapse of a predetermined amount of time, moving the nozzle to the other localized regions of the filter, and repeating the steps above for each of the other localized regions of the filter.

In one embodiment, the method further comprises the steps of measuring a parameter in the one of the localized regions of the filter following the lapse of a predetermined minimum amount of time, stopping the flow of the fluid through the one of the localized regions of the filter if the parameter is at a predetermined value following the lapse of the predetermined minimum amount of time, moving the nozzle to the other localized regions of the filter, and repeating the steps above for each of the other localized regions of the filter.

In one embodiment, the method further comprises the steps of continuing the flow of the fluid through the one of the localized regions of the filter for a predetermined maximum amount of time if the parameter in the one of the localized regions of the filter is not at the predetermined value following the lapse of the predetermined minimum amount of time, stopping the flow of the fluid through the one of the localized regions of the filter if the parameter in the one of the localized regions of the filter is at the predetermined value following the lapse of the predetermined maximum amount of time, repeating the steps above for each of the other localized regions of the filter.

In one embodiment, the method further comprises the step of repeating the steps above if the parameter in the one of the localized regions of the filter is not at the predetermined value following the lapse of the predetermined maximum amount of time.

In one embodiment, the parameter is rate of flow of the fluid through the one or more of the localized regions of the filter and further comprising the step of stopping the flow of the fluid through the one or more of the localized regions of the filter if the rate of flow of the fluid is above a predetermined threshold following the lapse of the predetermined amount of time.

In one embodiment, the method further comprises the step of conducting a thermal regeneration of the filter.

In one embodiment, the method further comprises the step of inspecting and analyzing the one or more localized regions of the filter prior to and/or following the step of applying the fluid to the one or more localized regions of the filter.

In one embodiment, the step of inspecting and analyzing the one or more localized regions of the filter comprises the step of measuring one or more of the filter weighty retentate volume, filter channel length, retentate composition, or location of retentate in the one or more localized regions of the filter.

Additional benefits and advantages of the present invention will become apparent to those skilled in the art to which the present invention relates from the subsequent description of the embodiment and the appended claims, taken in conjunction with the accompanying drawings.

DETAILED DESCRIPTION OF THE INVENTION

Figure 1:
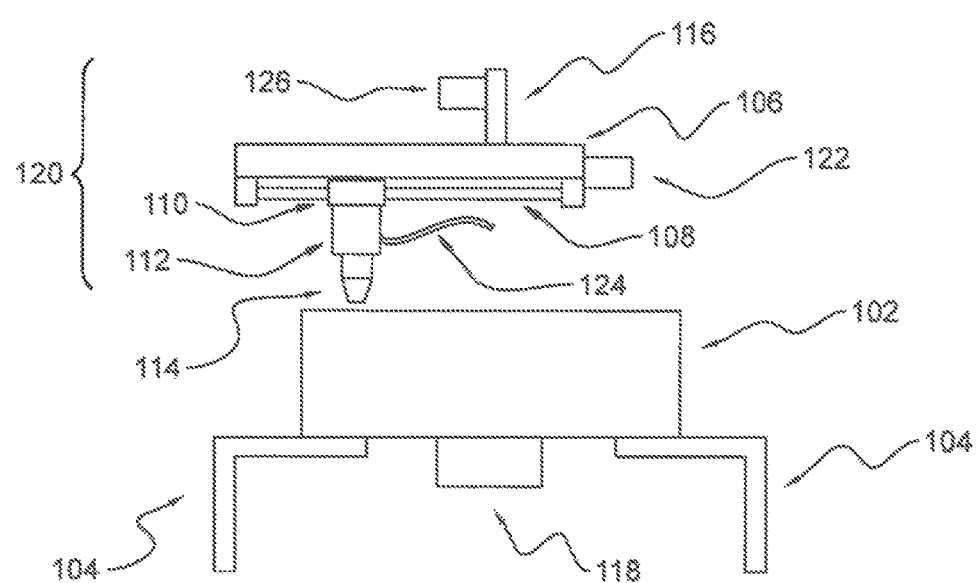
FIG. 1 represents a filter retentate removal system using an actuated, pressurized nozzle.

FIG. 1 depicts one embodiment of an automated filter retentate removal system using a combination of pressurized fluid applied through a nozzle 114, which seals against a portion of the filter medium 102. Automation in this embodiment is achieved through an actuation system where the nozzle is physically moved, though it could also be achieved by other means such as a valued manifold or a fluid conduit cluster, or even by manual means in another example.

An actuation mechanism 130 is depicted in FIG. 1 for the purposes of physically moving the nozzle 114. In one embodiment, a spindle 116 rotates about a central axis by means of an actuator 126, such as a stepper motor, but any actuator may be used. Attached to the spindle 116 is a linear housing 106 onto which one or more linear bearing rods 108 are mounted. These rods 108 along with a linear actuator 122 allow for a carriage 110 to move back and forth. Since the linear housing 106 rotates and the carriage 110 traverses the physical position of the carriage 110 may be moved to any location in a two-dimensional planar space.

The actuation mechanism 120 in this embodiment allows for location of the nozzle 114 in two-dimensional, polar coordinate space. However the device could use any coordinate system or combination of actuators for the purpose of moving the nozzle, and any coordinate system. This could include, for example, a two-dimensional linear actuation stage where the nozzle is moved in the x and y direction, as described by Cartesian coordinates. In this embodiment, stepper motors 122 and 126 are used to move the nozzle to precise locations. Alternate actuation methods may be employed including direct current motors with position feedback, angular positioners with encoders, rack and pinion systems, pneumatic or hydraulic cylinders, linear motors, or any other means of linear and/or rotational actuation. In general, any method for scanning the surface of the filter being cleaned can be used, at any one time performing the cleaning in a localized region. In another embodiment, the nozzle 114 may be fixed, while the filter medium 102 is moved or rotated to achieve the same result.

In this embodiment, a vertical actuator 112 is mounted to the carriage 110 in order to move a nozzle 114 in the third dimension. The actuator 112 also contains, and is powered by, a pressurized fluid supply 124, but may be powered by a solenoid, screw, or other means and the pressurized fluid supply may be housed elsewhere.

In another embodiments the two dimensional action mechanism 120 and vertical actuator 112 may be combined into a single system having three degrees of freedom. In another example multiple actuation systems may be used. Any positioning or actuation system or assembly may be employed to modify the position or orientation of the nozzle 114 relative to the filter medium 102 provided that the nozzle 114 is sealed against the filter medium 102 for all or a portion of the time in which the system is in operation.

The filter medium 102 may be mounted below the actuation mechanism 120 so that the nozzle 114 moves in a plane above its surface. The actuator 112 acts to lower the nozzle 114 to the surface of the filter medium 102 so that a seal is created between the nozzle 114 and the filter 102, thereby forcing the pressurized fluid to flow through a localized region of the filter 102 at high velocity. The supply pressure may depend largely on the specific geometry of the embodiment, properties of the filter medium, and desired flow rate and condition. For example, the fluid supply may range from 25 psig to 200 psig. The fluid supply may be steady, transient or pulsating.

In another embodiment, the nozzle 114 may be mounted below the filter medium 102 or two nozzles 114 may be used with one nozzle above and one below filter 114. In another embodiment, multiple nozzles 114 may be used and actuated in series, parallel, or some derivative thereof. One of the flows will be in the reverse direction of the main flow when the filter is in use.

Supports 104 for the filter medium 102 are designed such that the removed retentate is able to be ejected through the opposite side of the filter 102. This retentate may be either discarded or collected and analyzed.

Retentate removal may or may not include the use of vibrations in order to dislodge particulate matter from the filter 102 or collection medium. When vibrations are used, they may be applied either directly or indirectly to the filter medium 102. That is, a vibrating element 118 may be affixed directly to the filter medium 102 as shown, or may be applied indirectly, either through the cleaning stand 104, to the actuator mechanism 106, through nozzle 114, via the enclosure or by some other means. Vibrations can either be applied before, during or after pressurized fluidic cleaning, or any combination thereof. In this embodiment, vibrations are applied during cleaning and may range in acceleration from 10 g to 200 g, where g is the acceleration due to gravity. However, any vibration levels and frequencies may be used, including ultra-sonic frequencies in one embodiment.

In another embodiment, the filter medium 102 may be moved or its position adjusted with respect to the nozzle 114 so that localized fluid may be applied. This embodiment could include a stationary nozzle with a moving, positioned filter medium, or some combination of nozzle and filter position control.

Figure 2:
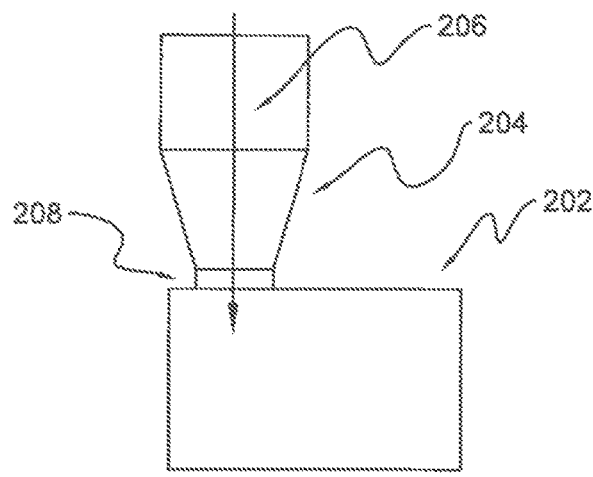
FIG. 2 represents a pressurized fluid supply, which seals against a portion of the filter medium.

Current filter cleaning techniques that utilize pressurized fluid involve global flow of the fluid through the filter or movement of a nozzle over the filter in two-dimensional space at a given height over the filter to be cleaned. Fluid may therefore take the path of least resistance over a large area, which is a prime disadvantage of these techniques. FIG. 2 illustrates a solution to this problem, whereby a nozzle 204 is lowered, by means of actuation, and seals on the surface of the filter 202. Pressurized fluid is therefore forced to flow from the nozzle 204 through the filter medium 202, thus preventing preferential flow through already clear paths, or flow around or away from the filter 202 itself.

In the illustrated embodiment, the nozzle 204 is lowered in the direction normal to the filter surface 206. A gasket or ring seal 208 may be used to improve the seal between the nozzle 294 and the filter 202. Pressurized fluid is then directed to flow through the nozzle 204 in the direction normal to the filter surface 206 and through the filter medium 202. The flow rate through the nozzle 202 may be varied and depends heavily on the supply pressure and cleaning media (gas, liquid, or solid). In this embodiment, for example, flow rates may range from 10 scfm to 150 scfm depending on the supply pressure, nozzle 204 size and properties, including cleanliness, of the filter medium.

In another embodiment, the filter 202 itself may be moved or positioned so as to seal itself with the nozzle. This embodiment may allow for positioning of the nozzle, filtration medium, or some combination thereof.

Figure 3:
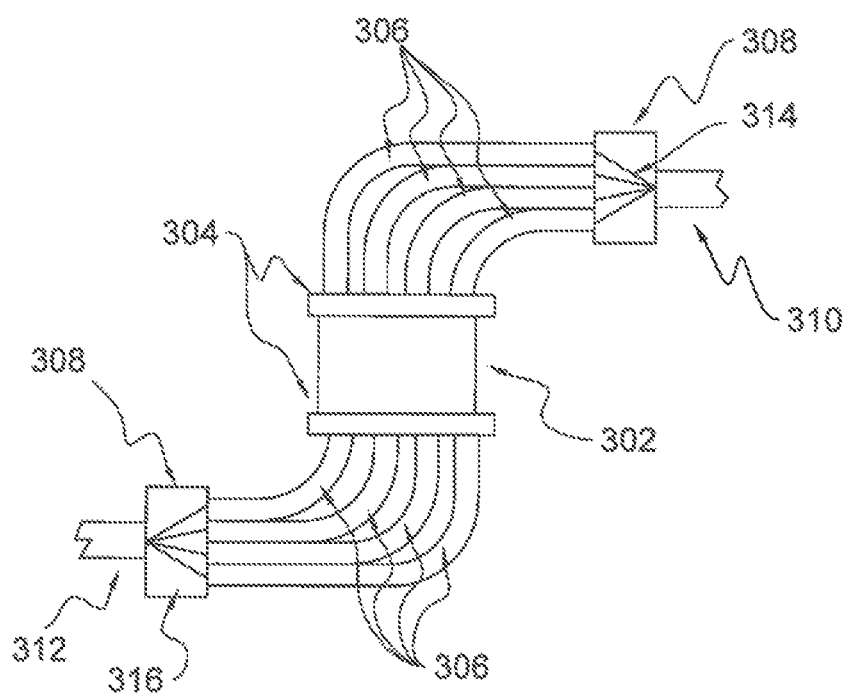
FIG. 3 represents an automated filter retentate removal system using a valved manifold in concert with a fluid conduit bundle on both ends of the filter medium.

FIG. 3 illustrates an alternate embodiment of the device using actuation via a valved manifold 308 in concert with a fluidic conduit cluster in order to obtain spatial positioning on the surface of the filter, and may avoid completely or partially the need for additional actuation systems to move the position of the cleaning nozzles relative to the surface of the filter.

In one embodiment, the filter medium 302 may be fixed. On the filter exit, or top side as shown here, is attached a conduit housing 304. The housing 304 seals against the filter 302. In one particular embodiment, the housing 304 may consist of a series of through-holes, which allow for fluid to pass through into the filter 302, and which may be fixed or adjustable. The housing 304 also contains a cluster of fluid conduit 306. The conduit 306 transfers pressurized fluid from a valve-actuated manifold 306 to the housing 304. The valve-actuated manifold 308 is supplied by a pressurized fluid supply 310. In another embodiment, the filter medium 302 may be moved or its position adjusted in relation to the conduit housing 304.

In one embodiment, fluid flows from the supply 310 to the manifold 308. A valve or series of valves 314 open and close to allow fluid to flow through a particular conduit 306 corresponding to a particular location on the surface of the filter 302 via the conduit housing 304. By sealing the housing to the filter through the use of a gasket or other means, it is ensured that the fluid travels through the filter at that particular location. Therefore, localized control of the fluid flow is ensured through valved actuation, rather than by position control.

Alternatively, this configuration may be used by applying the system to the inlet of the filter, as illustrated by the bottom surface of the filter 302 in FIG. 3. In this instance, the housing 304 would seal by means of a gasket or other means to the inlet of the filter. Conduit 306 would connect the housing to a second valved manifold 308 with a valve or series of valves 316. However, in this instance, the manifold would be supplied with a vacuum source 312 in one embodiment or a pressure source in another embodiment. In one embodiment the pressure source may be utilized to detect leakage of retentate through the back of the filter or generate turbulence to enhance retentate removal from the filter. The use of forward flow for leak detection may or may not employ a collection of conduits but may be via a single nozzle.

In another embodiment, vacuum could be applied to specific locations on the inlet face of the filter medium 302 through the use of the valved manifold 308 in concert with the conduit bundle 306 and housing 304. Fluid may be directed to flow to the vacuum supply 312 from the manifold 308. A valve or series of valves open and close to allow fluid to flow through a particular conduit 306 corresponding to a particular location on the surface of the filter 302 via the conduit housing 304. By sealing the housing to the filter through the use of a gasket or other means, it is ensured that the fluid travels through the filter at that particular location. In this embodiment one of the two sides may include a single conduit rather than a cluster of conduits. That is, pressurized fluid from the supply 310 may be directed by the valved manifold 308 with a valve or series of valves 314 locally through a conduit cluster 306 on the back face of the filter 302 while vacuum is drawn through a single conduit 306 on the front face. Alternatively, pressurized fluid may be directed to the filter 302 via a single conduit 306, while vacuum is locally applied to the front face via a conduit cluster 306 and a valved manifold 308 with a valve or series of valves 316.

Using the valved actuation method as illustrated in FIG. 3, any combination or configuration may be used. Pressurized fluid may be applied to the back of the filter medium, fluid at negative gauge pressure may be applied to the front face of the filter medium, or any combination of pressure and vacuum may be utilized.

In another embodiment, the filter medium itself may be moved or positioned so as to direct fluid locally through a specific region or regions, either with pressurized fluid or vacuum, or some combination thereof. This embodiment may also include a combination of actuation and valved manifolds to produce the same localized application effect with pressure, vacuum, or some combination thereof.

One significant advantage to the current invention is the ability to locally measure flow properties, general health, cleanliness and other properties of the filter medium. Current filter cleaning techniques may only provide information relating to the overall flow resistance of the filter, if at all. However the current invention allows for the measurement of flow and cleanliness characteristics in specific filter locations. These measurements may involve the addition of pressure and/or fluid flow sensors in line with the pressurized fluid supply, or other means of measuring the flow through the system. At each location, flow measurements may be made in order to identify clogged (low flow) and clean (high flow) locations or even damaged regions, with either very high or very low pressure differences. Additionally, the length of time at each location may be varied in order to optimize the retentate removal process. Flow and pressure measurements may allow for predetermined or in-situ dwell times of the nozzle and fluid flow at each location. In the latter case, flow measurements may be used to signal when cleaning at a given location is complete depending on when the flow increases past an acceptable threshold value. Pressure, flow, and dwell time information may be used to construct a flow map of the filter, which would assist in locating areas requiring further cleaning and inspection. Such a map provides a spatial indication of regions with high or low flow restriction, indicative of clogged regions or failed regions, respectively.

With reference to FIG. 1 one or more pressure sensors and one or more flow sensors may be mounted in line (or in fluid communication) with nozzle 114 and conduit 124 in order to measure the pressure and flow in conduit 124. The pressure and flow sensors may be one and the same or separate. Any type of pressure sensor and any suitable flow sensor, or flow measurement system or method, may be used.

Another embodiment may include a nozzle that is adjustable. When areas are identified that require further cleaning or more localized cleaning, the nozzle dimensions may be adjusted so as to modify the flow properties including but not limited to flow rate, velocity, and sonic condition, by adjustment of the upstream pressure or the nozzle geometry. Nozzle dimensions may be adjusted to the specific application size or to address the clog. These adjustments may include changes to the exit diameter, throat diameter if one exists, nozzle cross-sectional shape, or combination thereof. Adjustments to the nozzle shape and size may be related to the flow measurements or may be performed as part of a cleaning procedure.

Other advanced sensing techniques may also be used in-situ for determining the current or instantaneous retentate levels or clogging. One such example may be radio frequency sensing in order to determine instantaneous particulate matter loading within a ceramic filter, though any retentate sensing technique may be used on any filter substrate, including optical (light-based), x-ray, and other techniques.

Figure 4:
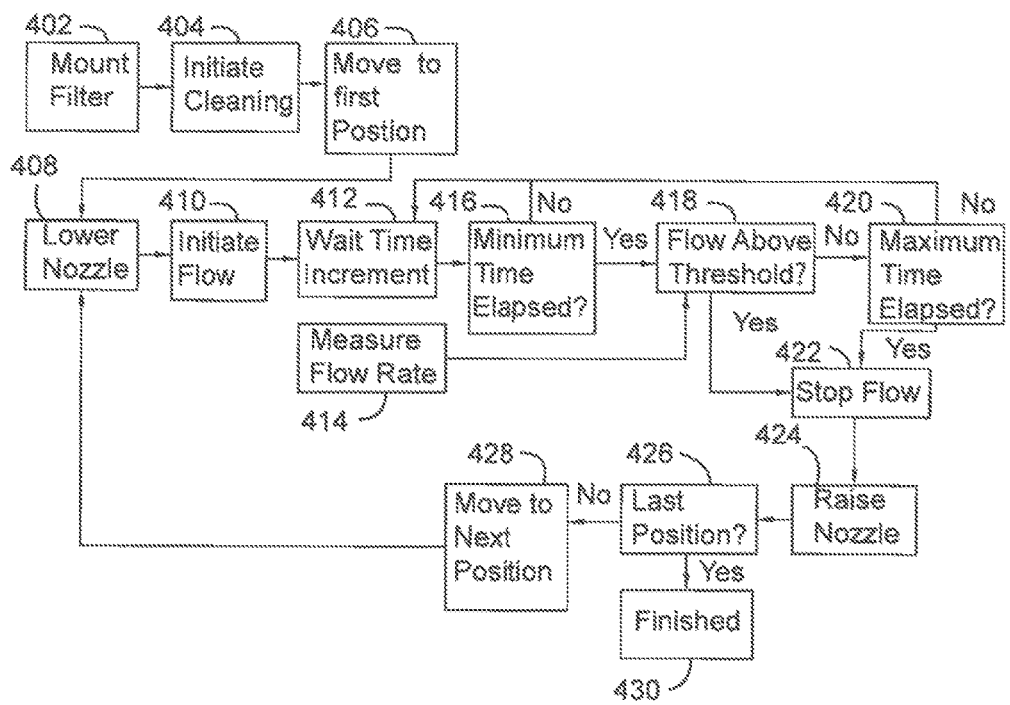
FIG. 4 represents an example flow chart illustrating one possible cleaning method using a positioned nozzle with time and flow measurement feedback.

FIG. 4 represents a flow diagram illustrating one possible filter retentate removal method using a position-controlled nozzle along with time and flow measurement feedback. At any given location, the nozzle residence time may be tracked along with the instantaneous flow rate. As long as a minimum residence time or nozzle dwell time has been reached and the instantaneous flow at the given location is above a threshold value, the nozzle would be allowed to move to a subsequent position. In addition to flow rate, pressure may also be used (where the criteria would require the measured pressure to be below a threshold value) or any other suitable parameter may be used. A map of the cleaned filter can be generated to indicate potential regions for cleaning or inspection, in particular, in the case of fractured walls in the filter that decrease the filter efficiency. In another example the map may indicate regions of high flow restriction or clogging within the filter.

In one exemplary method and embodiment, the filter is first mounted 402 into the cleaning apparatus. The cleaning process is initiated 404 whereupon the nozzle moves to its starting position 406. At this point, the main cleaning cycle may begin.

The nozzle is first lowered onto the filter substrate 408 and a seal is created between the nozzle and the filter. Once a seal is created, flow is initiated through the nozzle into the filter 410. After flow is initiated 410, the process begins to measure the flow rate through the nozzle and into the filter 414. In parallel, the process requires a specified incremental wait period 412. This may be predetermined and allows for the fluid to loosen and eject some of the trapped retentate. After the specified wait time 412 has elapsed, the process requires a logic condition 416 in order to determine whether a minimum cleaning time has been reached. If the time has not been reached, the process returns to the wait condition 412. If the minimum time has been reached, the process may move on to a second logic condition 418 in order to determine whether the flow or pressure through the filter has reached an acceptable threshold. At this point, if the flow is not sufficient to suggest a clean section, the process may move on to a third logic condition to determine if the residence time at that particular location has reached a certain upper value 420. If this is not the case, the process may return to the wait increment where the sequence is repeated. If either the flow is above the threshold limit 418 or the maximum time has elapsed 420, the process may move on to stop the flow 422. At this point, the nozzle may be raised 424 and the process may proceed to its final logic condition 426 to determine whether the entire cleaning process has completed. If not, the nozzle may move to the next position 428 whereby the process may be repeated at the next subsequent location. Otherwise, the process may be complete and may be terminated 438.

This embodiment describes both minimum 416 and maximum 420 residence times for each location on the filter. It also may utilize a measured quantity such as flow rate 414 in order to determine the flow resistance of the filter at that particular location, but may be any quantity including pressure. However in other embodiments, different measured quantities may be used in order to determine residence times at each location. Such quantities may include global or spatially specific parameters such as back pressure, x-ray analysis, radio-frequency interrogation using resonance or non-resonance means, weight measurements, light or laser transmission or absorption measurements, ultra-sonic flaw detection, acoustic measurements, terahertz measurements, or any other suitable measurement system. Alternatively, the process may involve a fixed residence time at each location without the use of a measured quantity for feedback.

Figure 5:
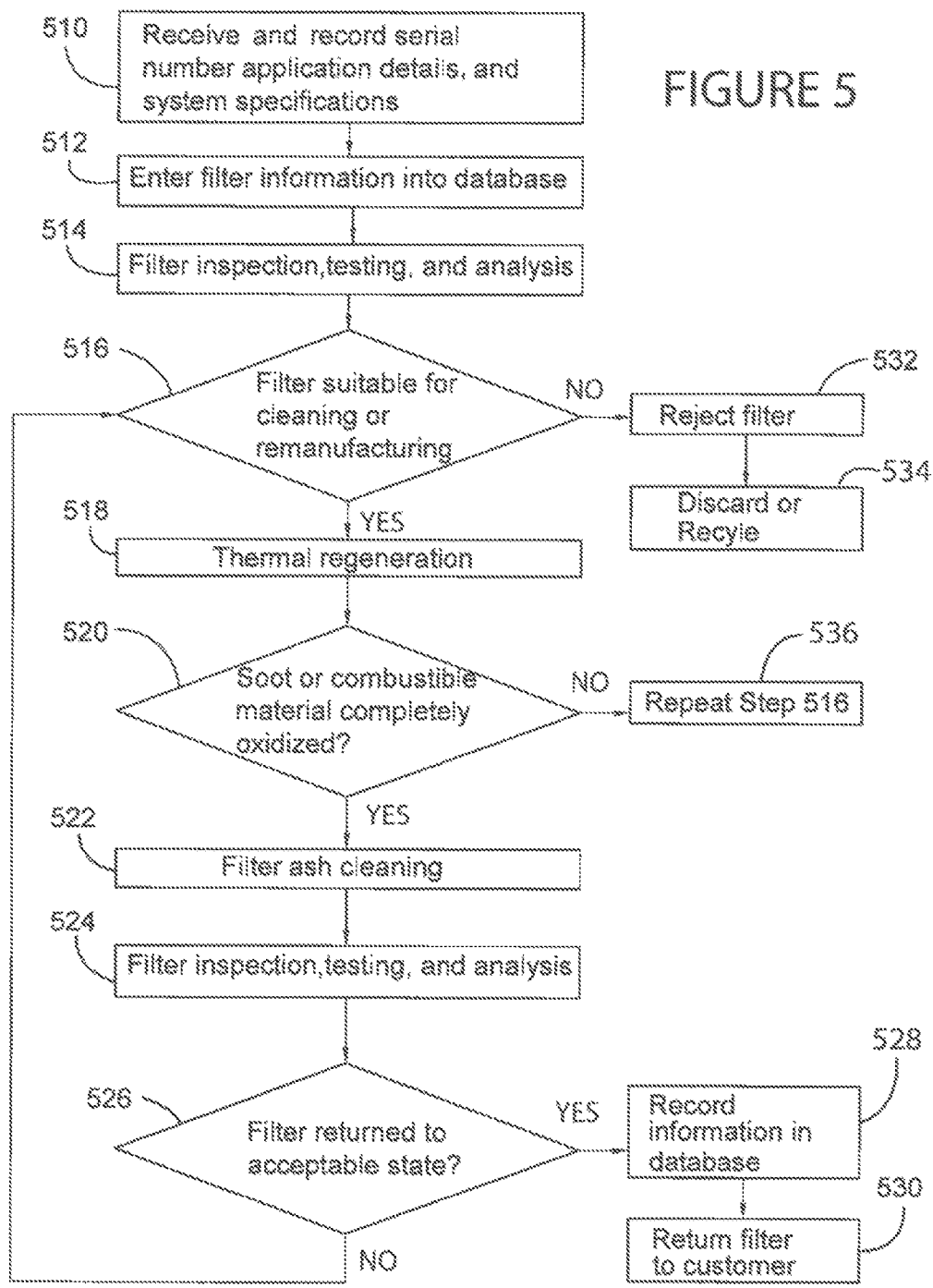
FIG. 5 represents an example flow chart detailing a cleaning process.

FIG. 5 shows a flow diagram of one exemplary embodiment of a filter cleaning process. The steps can be executed using the systems and methods described in reference to FIG. 1-4 or any other suitable cleaning system. In a first step 510 the filter 102 is received and information is recorded which may include the serial number, part number, filter size, geometry, material, or any other identifying or relevant information. The information may then be entered into a database or recorded by any suitable means in a subsequent step 512. The recording may be manual or automated, such as by scanning or image processing on one example.

In a further subsequent step 514 an inspection, analysis, or one or more tests may be conducted to ascertain information regarding the condition of the filter, the extent of retentate accumulation, or indications of filter or equipment malfunctions or failures. In one embodiment, the inspection and analysis step 514 may include on or more of the following measurements or analyses: filter weight, retentate volume, open channel length, retentate composition, or location of retentate within the filter. Low pressure drop for a given flow (or high flow rate for a given pressure drop) in localized regions may also indicate filter failure. Additionally visual inspection of the filter surfaces may also be conducted for signs of improper operation, such as stains, abnormal deposits, soot or retentate leakage, oil, fuel, or coolant material deposits, cracking, pitting, missing pleats, missing end plugs, fractured channels, or other signs of abnormal operation, or filter defects or failures. Internal inspection of the filter 102 may also be accomplished by borescope, fiberscope, x-ray, light analysis, or some other means.

Examples of tools or measurement/inspection techniques which may be applied in inspection and analysis step 514 may include but not be limited to: pin gauge or drop rod measurements, x-ray analysis, radio-frequency interrogation using resonance or non-resonance means, materials analysis using Raman, x-ray diffraction, inductively coupled plasma, x-ray fluorescence, energy dispersive x-ray, Fourier transform infra-red, weight measurements, light or laser transmission or absorption measurements, light box measurements, ultra-sonic flaw detection, acoustic measurements, terahertz measurements, or any other suitable measurement system. Measurements of filter flow restriction such as through flow bench testing, whereby either or both the flow rate and pressure drop across the filter are measured, may also be used. In a preferred embodiment, the flow restriction, of the filter is evaluated over a range of flow rates, similar to the flow rate experienced by the filter in operation, and the specific flow rate and pressure drop across the filter is measured.

Samples of the filter material or collected retentate may also be removed from the surface of filter 102 or from inside the channels or pleats of filter 102 for subsequent analysis or characterization in step 514. In one exemplary embodiment, retentate samples may be removed from filter 102 at one or more locations and subjected to compositional analysis. In a further step (not shown in FIG. 5) the compositional analysis may be used to determine or deduce the operating state of the equipment or machinery on which the filter is installed. In one exemplary embodiment, results of the retentate analysis may be used to detect high oil consumption, poor quality fuels, injector malfunctions, coolant leakage, the failure of upstream filters or exhaust catalysts, or any other system components.

The results of inspection step 514 stay be used to determine whether or not the filter is suitable for cleaning, re-conditioning, or re-manufacturing in step 516. In one example, if the results of step 514 detect signs of filter failure such as cracks, melted regions, missing filter sections, missing end plugs, sintered deposits, or retentate accumulation which cannot be removed (such as by chemical bonding) then the filter 102 may be rejected in step 532 and discarded or recycled in subsequent step 534. In some cases, depending on the extent of the filter 102 failure or defect, the failure or defect may be repaired in a step (not shown) and the filter 102 returned the cleaning process flow to step 510 or step 516. Repair of the filter may include re-plugging of cells or replacement of missing end-plugs, addition of catalyst materials, replacement of the matting or canning, and the like.

If the filter 102 is determined, in step 516 to be suitable for cleaning or a remanufacturing, the filter 102 may be subjected to a thermal regeneration step 518. The thermal regeneration may be conducted using an engine, such as a parked regeneration or high idle regeneration, a burner, an in-line electrical heater, microwave heating, plasma-assisted regeneration, or using a kiln, oven, or furnace, or any other suitable means for heating the filter 102. Additional gaseous components, including supplemental oxygen, hydrogen or NOx (NO2) may or may not be applied in the regeneration step 518. The regeneration may be for a predetermined amount of time, such as from 8 hrs. to 40 hrs. or any suitable amount of time. In another embodiment, the regeneration may be conducted until the soot and combustible material has been substantially removed from the filter, as determined by pressure, weight, radio frequency, optical, light-based, x-ray or any other suitable measurements.

In one embodiment the temperature increase ramp rate and set point temperature may be controlled during the regeneration process. In another embodiment, room temperature or heated air may be introduced to flow through a portion or all of the filter 102. In another embodiment, a temperature above 600° C. may be achieved during the regeneration process to preferentially induce a volume reduction of the incombustible retentate, such as ash in one example.

Following regeneration step 518 a determination of the completeness of the regeneration may be made in step 520. Step 520 involves determining whether or not the soot or combustible material has been sufficiently oxidized. The determination may be made based on visual inspection, use of a borescope or fiberscope, weight measurements, pin gauge measurements, x-ray or optical measurements or any other suitable measurement or inspection method. Measures of flow restriction or pressure drop may also be used. If it is determined in step 520 that the soot or combustible material has not been sufficiently oxidized, step 516 may be repeated as indicated in step 536.

If it is determined in step 328 that filter 102 has been sufficiently regenerated, then ash or retentate cleaning and removal may commence in step 522. Retentate removal may include pneumatic or vibration means, as described in reference to FIG. 1-4. The cleaning may proceed for a predetermined amount of time, or be controlled based on in situ measurements of filter clogging or retentate levels, such as through measurements of pressure or flow across the entire filter 102 or a portion thereof, where the portion is less than the whole, or by radio frequency measurements, x-ray measurements, measurements of the amount or retentate removed (such as by mass or volume in one example), or measurements of the amount of retentate remaining in the filter in another example, or any other suitable measurements. The in situ measurements may be used to control the operation and process parameters for the cleaning system, such as the vibration level (in the case where vibration cleaning is used) or air flow rate or pressure.

Following step 522 an additional inspection, analysis, or test step may be completed, designated 524. The inspection and analysis step 524 may include at least one of the measures of filter state or performance as described in reference to step 514. The results of inspection and analysis step 524 may be used to determine whether or not the filter has been returned to an acceptable state, based on step 526. If the filter 102 has not been returned to an acceptable state, the process may repeat with step 516 or even at step 510 or 512 (not explicitly shown in FIG. 5).

If it is determined in step 526 that filter 102 has been returned, to an acceptable state, the results of the cleaning process, steps 518-524, may be recorded in step 528 in a database, record, log book, or an suitable location and using any suitable means, and the filter 102 may be returned to the customer in step 330.

Not all steps listed in FIG. 5 need to be completed, nor do the steps need to be completed in the order or sequence listed. For example, step 518 may be omitted in one case where negligible levels of combustible material are accumulated in filter 102. In another example step 522 may be omitted where negligible amounts of incombustible material is contained in the filter 102. In another example, steps 510 to 514 or step 524 may be omitted. Therefore, there are many combinations of steps that may be conceived based on those listed in FIG. 5 which have not been explicitly described, but which may achieve the same overall objective.

While the above description contains much specificity, this should not be construed as limiting the scope of any embodiment, but as exemplifications of the presently preferred embodiments thereof. Many other ramifications and variations are possible within the teachings of the various embodiments. For example, the cleaning system configuration and layout may easily be modified from that described herein and alternative embodiments may or may not include all of the components and may or may not employ all of the methods of operating the system described in this disclosure.

It will also foe apparent to those skilled in the art that the present disclosure relates not only to a particulate filter cleaning system and method, but a system and method for cleaning any type of filter, such as air filters, liquid filters, filter bag houses, and the like, where knowledge of filter loading, by contaminant matter or any other material, and control of filter operation are important.

Thus the scope of the invention should be determined by the appended claims and their legal equivalents, and not by the examples given.

What is claimed is:

1. A method for removing retentate from a filter that has been removed from an engine for cleaning and comprising the steps of:

a) providing a cleaning stand, the filter including a first side seated on the cleaning stand and a second side opposed to the first side;
b) providing a fluid nozzle sealed against one or more localized regions of the second side of the filter for applying a fluid to the one or more localized regions of the second side of the filter and for dislodging and removing the retentate from the one or more localized regions of the filter and ejecting the retentate through the first side of the filter seated on the cleaning stand;
c) providing a carriage which locates the fluid nozzle against the one or more localized regions of the second side of the filter, the filter being mounted below the carriage and the nozzle extending above the second side of the filter; and
d) providing and using one or more non-pressure based sensors for:
   i) measuring one or more parameters in one of the localized regions of the filter;
   ii) stopping the flow of the fluid through the one of the localized regions of the filter following the lapse of a predetermined minimum amount of time if the one or more parameters is at a predetermined value following the lapse of the predetermined minimum amount of time; or
   iii) continuing the flow of the fluid through the one of the localized regions of the filter for a predetermined maximum amount of time if the one or more parameters in the one of the regions of the filter is not at the predetermined value following the lapse of the predetermined minimum amount of time; and
e) using the carriage to move the fluid nozzle from the one of the one or more localized regions of the filter to another one of the one or more localized regions of the filter after the flow of the fluid through the one of the localized regions of the filter has been stopped following the lapse of the predetermined minimum amount of time or the predetermined maximum amount of time.

2. The method of claim 1 wherein the one or more sensors for measuring one or more parameters in the one or more of the localized regions of the filter provide a spatial indication of regions with high or low flow restriction in the one or more of the localized regions of the filter during the operation of the system.

3. The method of claim 2 wherein the one or more sensors for measuring the one or more parameters in the one or more localized regions of the filter during the operation of the system provide flow and dwell time information for constructing a flow map providing the spatial indication of the regions with high or low flow restriction in the one or more of the localized regions of the filter.

4. The method of claim 1 further comprising the step of inspecting and analyzing the one or more localized regions of the filter prior to and/or following the step of applying the fluid to the one or more localized regions of the filter.

5. The method of claim 1 wherein the step of providing the one or more non-pressure based sensors includes the step of providing a radio frequency sensor to determine retentate loading in the filter.

6. The method of claim 1 further comprising providing a vibrating element for applying a vibration to the filter and for dislodging and removing the retentate from the filter.

7. The method of claim 1 further comprising the step of repeating step d) prior to step e) if the parameter in the one of the localized regions of the filter is not at the predetermined value following the lapse of the predetermined maximum amount of time.

* * * * *